United States Patent

Walker et al.

[11] Patent Number: 4,506,923
[45] Date of Patent: Mar. 26, 1985

[54] TAKEOUT TONG HEAD

[75] Inventors: Richard A. Walker; Robert J. Douglas, both of North Granby, Conn.

[73] Assignee: Emhart Industries, Inc., Farmington, Conn.

[21] Appl. No.: 464,799

[22] Filed: Feb. 7, 1983

[51] Int. Cl.³ ............................ B66C 1/42; B66C 1/28
[52] U.S. Cl. ...................................... 294/87.1; 294/115
[58] Field of Search .............. 294/87 R, 87.22, 87.24, 294/88, 118, 115, 106; 260/172, 260; 414/739

[56] References Cited

U.S. PATENT DOCUMENTS 3,981,673  9/1976  Sokolow ........................... 294/87 R
4,379,581  4/1983  Perry .................................... 294/115

Primary Examiner—James B. Marbert
Attorney, Agent, or Firm—H. Samuel Kieser

[57] ABSTRACT

A takeout tong head includes a support bracket having an upper portion adapted to be attached to a takeout arm and a lower portion having at least one cylinder housing. A cylinder and tong assembly is associated with each cylinder housing and includes a mounting flange removably attached to the cylinder housing, a cylinder extending into said cylinder housing, a piston member in said cylinder, a scissors tong assembly extending downwardly from said flange, a piston rod extending from the piston to the scissors tong assembly, and a spring contained between said flange and said piston member.

8 Claims, 3 Drawing Figures

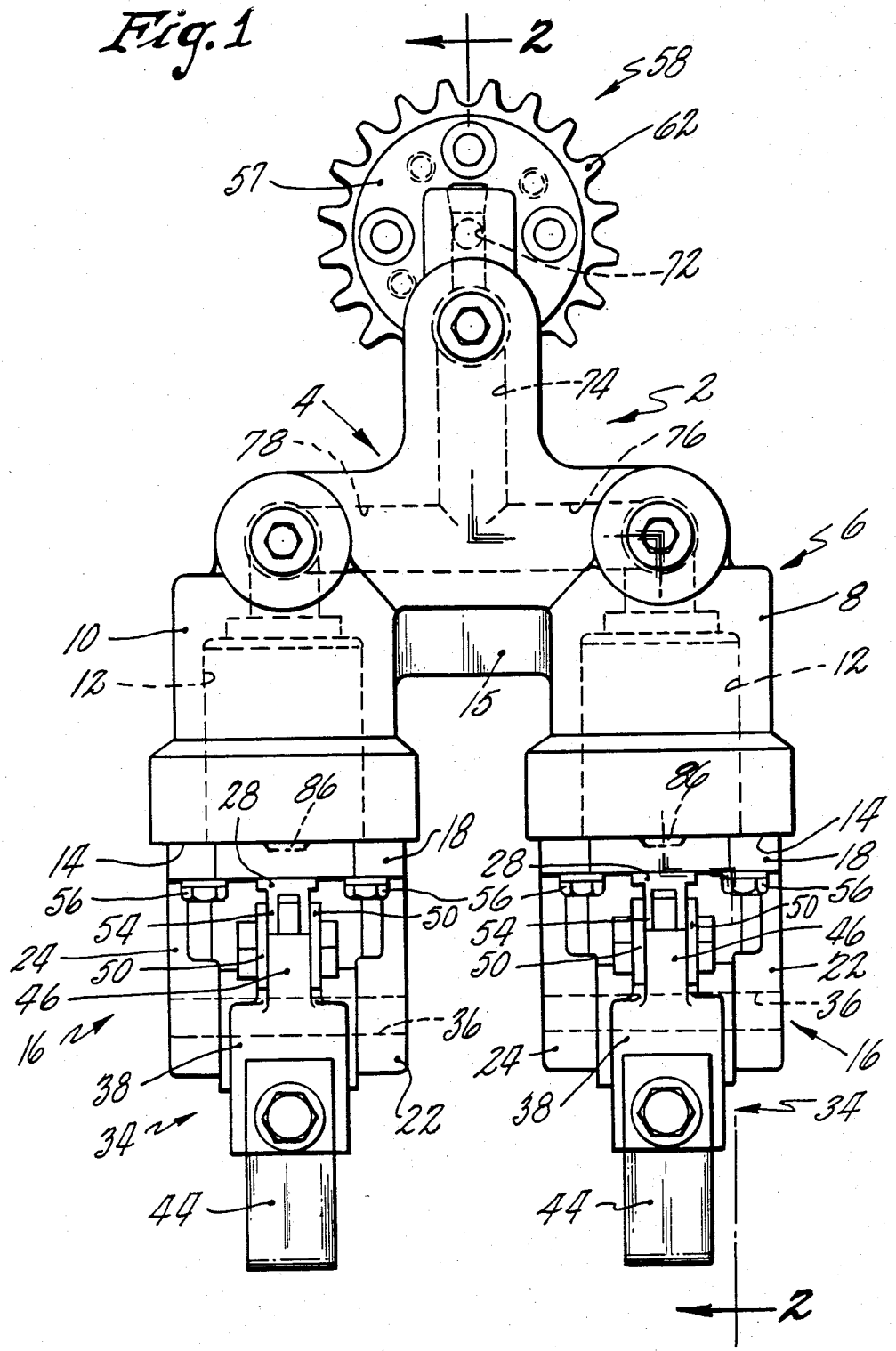

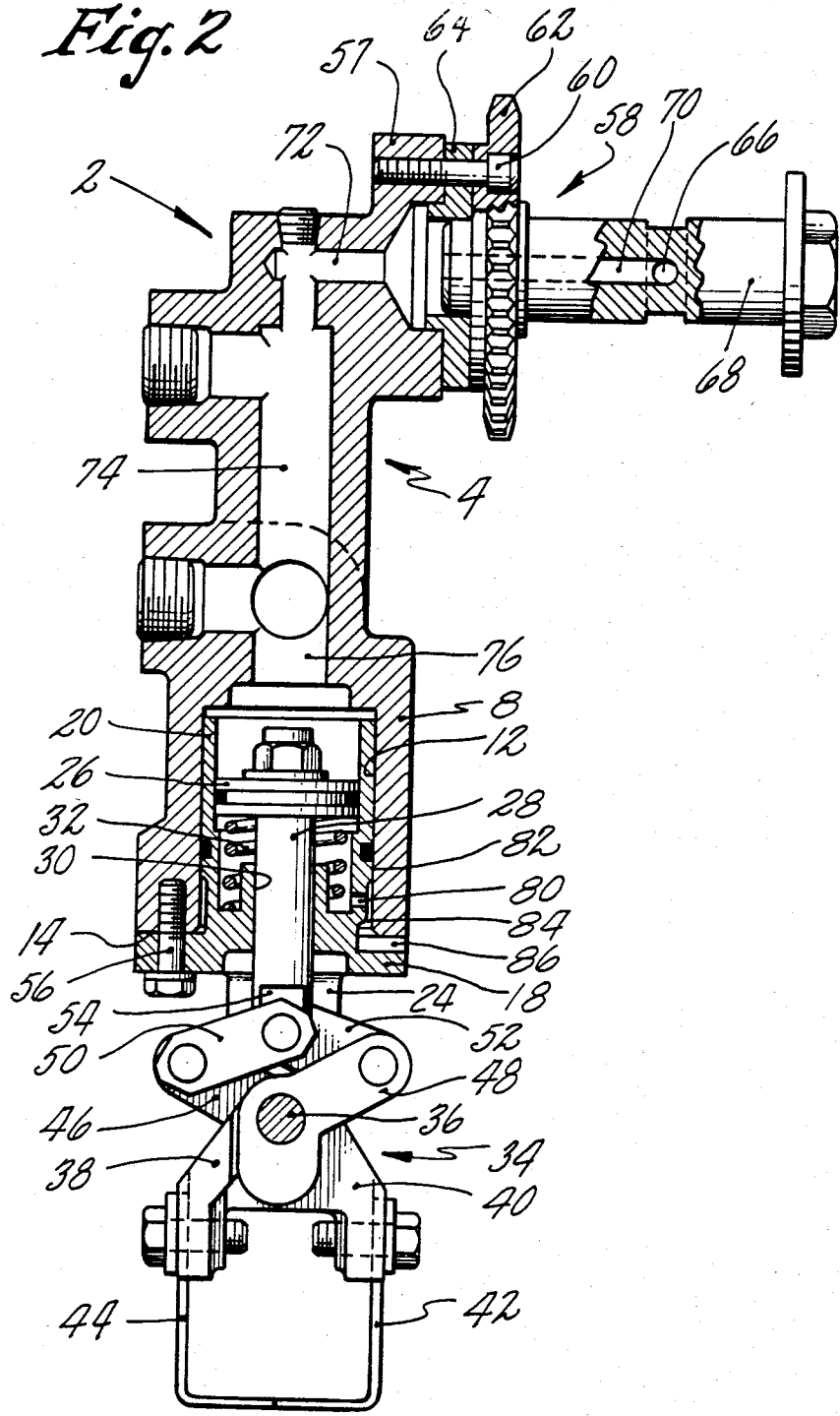

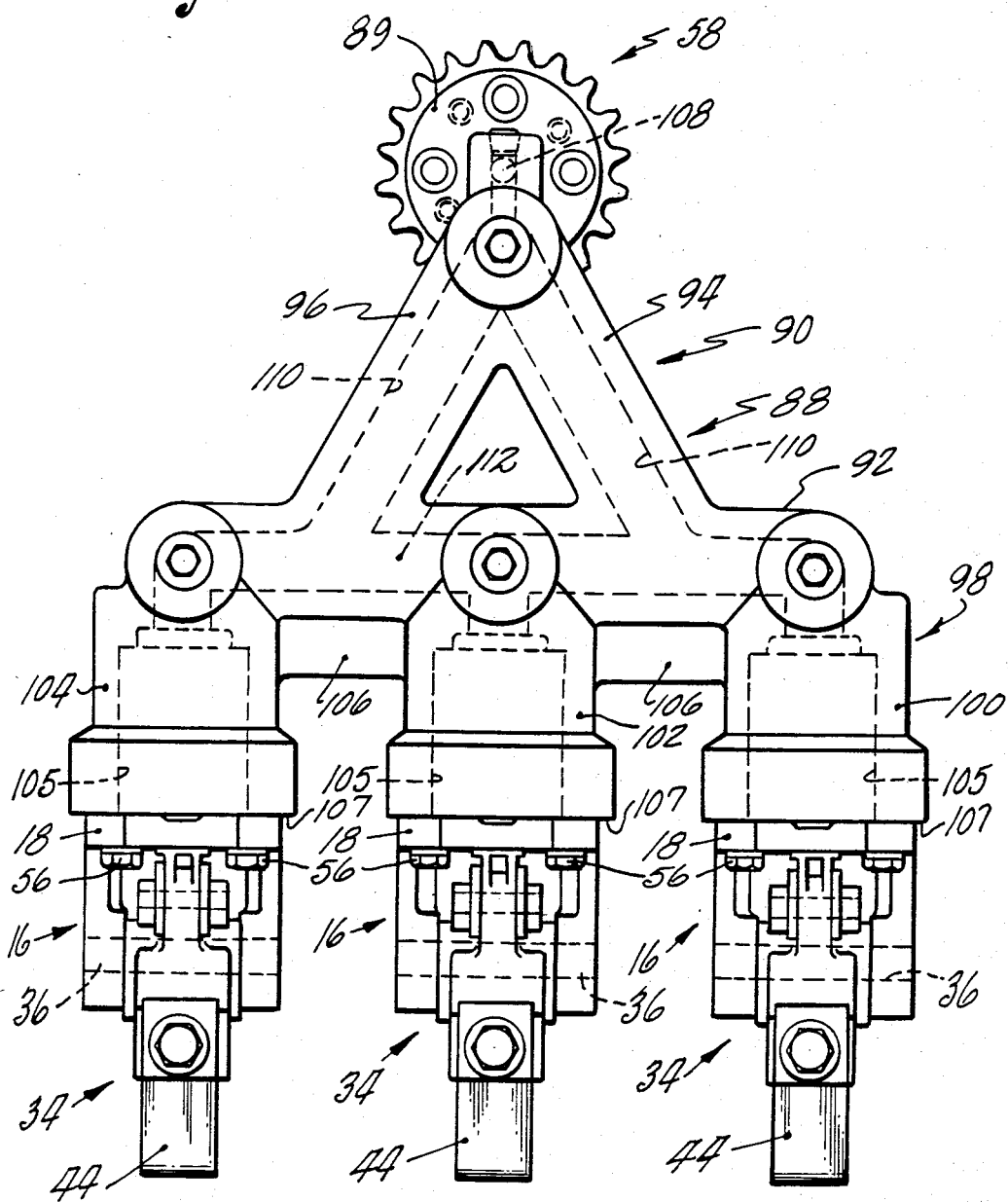

TAKEOUT TONG HEAD

BACKGROUND OF THE INVENTION

In general, this invention relates to a device for transferring containers from one station to another. More particularly, this invention relates to a takeout tong head for transferring glassware articles from the final molding station of a glassware forming machine to a cooling station.

Typical takeout tong heads are shown in U.S. Pat. Nos. 2,277,828, 3,549,191 and 4,185,985. In U.S. Pat. Nos. 2,277,828 and 3,549,191, a single piston and cylinder mechanism is utilized to operate a plurality of individual scissor tong assemblies. In devices of this type, each tong head assembly is simultaneously actuated by a single piston and cylinder mechanism. One of the inherent problems of devices of this type is that in the event that one of the tong assemblies does not engage a piece of glassware properly, the tongs associated with that tong assembly will not completely close preventing the piston from being completely depressed. The result of this is that the other tong assembly will not operate properly.

In U.S. Pat. No. 4,185,985 the takeout tong head assembly has a piston and cylinder mechanism associated with each one of the scissor tong assemblies. However, in the event of wear, it is a relatively complicated procedure to replace any of the various individual mechanisms of the device.

SUMMARY OF THE INVENTION

It is an object of the present invention to provide an improved takeout tong head.

More particularly, it is an object of this invention to provide a takeout tong head wherein worn or damaged parts can be quickly replaced.

A further object of the present invention is to provide a takeout tong head with increased stability.

Yet another object of the present invention is to provide a takeout tong head having a minimal number of individual parts.

These and other objects of the present invention may be achieved through the provision of a takeout tong head comprising a support bracket having an upper portion adapted to be attached to a takeout tong arm and a lower portion having at least one cylinder housing. A cylinder and tong assembly is provided for each housing with such assembly including a removable mounting flange attached to the lower end of each housing. A cylinder extends upwardly from said flange into the cylinder housing. A scissors tong assembly is mounted on the mounting flange in a position below the cylinder. A piston member is provided within the cylinder and a piston rod extends therefrom to said scissors tong assembly to cause the operation thereof upon movement of the piston.

BRIEF DESCRIPTION OF THE DRAWINGS

FIG. 1 is an elevational view of a takeout tong head having two scissor tong assemblies constructed in accordance with the present invention.

FIG. 2 is a vertical sectional view taken along the lines 2—2 of FIG. 1.

FIG. 3 is an elevational view of a takeout tong head having three scissor tong assemblies constructed in accordance with the present invention.

DETAILED DESCRIPTION

Referring to FIGS. 1 and 2, the takeout tong head includes a support bracket 2 having an upper portion 4 which is in the shape of an inverted "T." A lower portion 6 of the support bracket 2 includes two downwardly extending spaced cylinder housings 8 and 10 each having a chamber 12 therein opening from the bottom surface 14. The support bracket 2 may also include a reinforcing rib 15 extending between the two spaced cylinder housings 8 and 10 as shown in FIG. 1. Preferably, the entire support bracket 2 is formed as a one piece casting.

A cylinder and tong assembly 16 is removably attached to each of the cylinder housings 8 and 10. Each cylinder and tong assembly 16 includes a mounting flange 18 which has an integral cylinder 20 extending upwardly therefrom and a pair of hanger brackets 22 and 24 extending downwardly therefrom and integral therewith. A piston 26 is received within the cylinder 20 and includes a piston rod 28 extending downwardly through an opening 30 in the mounting flange 18. A compression spring 32 is provided between the piston member 26 and the mounting flange 18 to bias the piston member into its uppermost portion within the cylinder 20.

Each cylinder and tong assembly 16 includes a scissors tong assembly 34 is connected to the hanger brackets 22 and 24 by means of a horizontally disposed pivot pin 36 which extends between the two hanger brackets 22 and 24. The pivot pin 36 supports two tong holders 38 and 40 each of which carries a tong jaw or article gripping member 42 or 44. Each of the tong holders 38 and 40 is provided with upwardly extending inclined crank arm 46, 48 which are connectable by links 50 and 52 and suitable pivot pins to the end portion 54 of the piston rod 28. Each cylinder and tong assembly 16 is attached to the support bracket 2 by inserting the cylinder 20 into its respective cylinder housing 8 or 10 of the support bracket and attaching the mounting flange 18 to the bottom surface of the cylinder housing 8 or 10 means of bolts 56 or other suitable fasteners.

The upper end of the upper portion 4 of the support bracket 2 includes a circular boss 57 which is adapted to be attached to a shaft and sprocket assembly 58 by means of bolts 60 extending through the sprocket 62 and a wear plate 64 into the support bracket 2 as shown in FIG. 2. The shaft and sprocket assembly 62 serve as a means for attaching the takeout tong head to a conventional oscillating takeout tong arm. As is conventional, the shaft and sprocket assembly 58 is used to maintain the takeout head in a vertical position during oscillation of the takeout tong arm.

A port 66 is provided in the shaft 68 of the shaft and sprocket assembly 58 to provide an inlet for fluid to an axial passage 70 in the shaft 68. The passage 70 communicates through a port 72 in the support bracket 2 with a vertically extending passage 74. The passage 74 extends downwardly to a point adjacent the bottom of the upper portion 4 of the support bracket 2, where the passage splits into two passages 76 and 78 which extend to the chamber 12 of each of the cylinder housings 8 and 10 as shown by the dotted lines in FIG. 1 to provide operating fluid to the cylinder and tong assemblies 16.

An outlet port 80 is provided in the sidewall 82 of each cylinder 20 which communicates with a circumferentially extending passageway 84 between the sidewall 82 of the cylinder 20 and the wall of the chamber 12 of its respective cylinder housing 8 or 10. Such passageway 84 is formed by reducing the outer chamber of the cylinder 20 in the area of the passageway as shown in FIG. 2. An outlet port 86 is provided in the mounting flange 18 as shown which provides communication between passageway 84 and the atmosphere.

In operation, with no fluid pressure being applied to the cylinder and tong assemblies 16, the spring 32 maintains the piston member 26 in its upper position which in turn results in the opening of the scissor tong assemblies 34. When it is desired to close the scissor tong assemblies 34, fluid is admitted into the cylinder housings 8 and 10, forcing the piston members 26 downwardly which in turn causes the jaw elements to close. Air below the piston member 26 is forced out through port 80, passageway 84 and outlet port 86 to the atmosphere.

FIG. 3 shows a takeout tong head adapted to utilize three cylinder and tong assemblies 16 of the type previously described. In this case, the support bracket 88 includes an upper portion 90 which is generally triangular shaped with the base 92 extending past both legs 94 and 96. A lower portion 98 of the support bracket 88 includes three downwardly extending spaced cylinder housings 100, 102 and 104 each having a chamber 105 therein opening from the bottom surface 107 as shown by the dotted lines. A cylinder housing 100 and 104 is provided at each end of the base 92 of the upper portion 90 of the support bracket with the cylinder housing 102 spaced in the middle between the cylinder housing 100 and 104. The support bracket 88 may also include reinforcing ribs 106 between the cylinder housings 100, 102 and 104 as shown. A cylinder and tong assembly 16 identical to that previously described in connection with FIGS. 1 and 2 is removably attached to each of the cylinder housings 100, 102 and 104 by means of bolts 56 or other suitable fasteners.

The upper end of the support bracket 88 includes a circular boss 89 and is adapted to be attached to the shaft and sprocket assembly 58 in the manner described aove. The upper end of the support bracket 88 is provided with a port 108 which provides fluid communication between the passage 70 (not shown in FIG. 3) in the shaft and sprocket assembly 58 and a passageway 110 in each of the legs 94 and 96. The passageway 110 in the legs 94 and 96 communicate with a horizontally extending passageway 112 in the base 92 which in turn communicates with the chamber 105 of each cylinder housings 100, 102 and 104.

The operation of the embodiment of FIG. 3 is similar to that of FIGS. 1 and 2. If no fluid pressure is applied to the chamber 105 of the cylinder housings 100, 102 and 104, each of the scissor tong assemblies 34 are maintained in their open position. Application of fluid pressure results in the closing of each of the scissor tong assemblies 34.

It will be noted with the above-described arrangements, in the event of wear, or damage to a part of the cylinder tong assembly 16, the assembly 16 may be easily removed by removal of the bolt members 56. The assembly 16 can be removed as a unit and a new one replaced. This results in a minimum of down time to the machine. Additionally, with the present arrangement, as the bolts 56 are symmetrically arranged, the direction of opening of the jaw elements 38 may be changed by 90° simply by removing the bolt 56, rotating the cylinder and tong assembly 16 90°, and reinserting the bolts 56.

While reference has been made above to specific embodiments of the invention, various modifications and alterations will readily suggest themselves to those skilled in the art. Accordingly, it is intended that the scope of this invention be ascertained by reference to the following claims.

What is claimed is:

1. A takeout tong head comprising a support bracket having an upper portion adapted to be attached to a takeout arm and a lower portion having at least one cylinder housing, a cylinder and tong assembly for each cylinder housing, each said assembly including a mounting flange removably attached to its respective cylinder housing, a cylinder integral with said flange and extending upwardly therefrom into said cylinder housing, a piston member within said cylinder, a scissors tong assembly extending downwardly from said flange below said cylinder, a piston rod extending from said piston to said scissor tong assembly to cause the operation thereof upon movement of the piston, and a spring contained between said flange and said piston member to urge said piston member in a direction away from said flange.

2. The takeout tong head of claim 1 wherein there are at least two cylinder housings.

3. The takeout tong head of claim 1 wherein the support bracket is a one-piece casting.

4. The takeout tong head of claim 1 further including a fluid inlet port in the upper portion of said support bracket and passageways in said support bracket providing communication between said fluid inlet and each of said cylinder housings.

5. The takeout tong head of claim 1 wherein said upper portion of said support bracket is in the shape of an inverted "T" and there are two spaced cylinder housings extending downwardly from said upper portion.

6. The takeout tong head of claim 5 wherein said upper portion of said support bracket includes a fluid inlet port and said support bracket includes passageways providing communication between said fluid inlet port and said cylinder housings.

7. The takeout tong head of claim 1 wherein said upper portion of said support bracket is generally triangular shaped and there are three spaced cylinder housings extending downwardly from said upper portion.

8. The takeout tong head of claim 7 wherein said upper portion of said support bracket includes a fluid inlet port and said support bracket includes passageways providing communication between said fluid inlet port and said cylinder housing.

* * * * *